(12) United States Patent
Wilkinson et al.

(10) Patent No.: US 9,350,256 B1
(45) Date of Patent: May 24, 2016

(54) COMMON SLOT BATTERY BACKUP UNIT FOR NETWORK DEVICES

(75) Inventors: Keith Iain Wilkinson, Livermore, CA (US); William P. Cerreta, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 395 days.

(21) Appl. No.: 13/591,985

(22) Filed: Aug. 22, 2012

(51) Int. Cl.
*H02M 3/335* (2006.01)
*H02M 1/00* (2006.01)
*H02M 3/156* (2006.01)
*H02M 3/158* (2006.01)
*H02J 1/04* (2006.01)
*H02J 7/00* (2006.01)

(52) U.S. Cl.
CPC .............. *H02M 3/33561* (2013.01); *H02J 1/04* (2013.01); *H02J 7/00* (2013.01); *H02M 3/156* (2013.01); *H02M 3/158* (2013.01); *H02M 2001/009* (2013.01)

(58) Field of Classification Search
CPC ............. H02J 1/04; H02J 7/00; H02M 3/156; H02M 3/158; H02M 3/33561; H02M 2001/009
USPC .......................... 323/267; 320/111, 125, 163; 307/64–66, 82, 85
See application file for complete search history.

(56) References Cited

U.S. PATENT DOCUMENTS 7,560,831 B2 * 7/2009 Whitted et al. ................. 307/64

* cited by examiner

*Primary Examiner* — Yemane Mehari
(74) *Attorney, Agent, or Firm* — Parker Ibrahim & Berg LLC; James M. Behmke; Stephen D. LeBarron

(57) ABSTRACT

An internal common slot battery backup unit (CSBBU) is provided that can be placed in a network device's power supply unit (PSU) slot. The CSBBU has the same features of a PSU and communicates with other PSUs in the network device in order to determine when it should supply power to the networking device and when it should be in a recharging state.

7 Claims, 5 Drawing Sheets

COMMON SLOT BATTERY BACKUP UNIT FOR NETWORK DEVICES

TECHNICAL FIELD

The present disclosure relates generally to powering electronic devices with batteries.

BACKGROUND

The growth of the internet has required larger and more reliable data centers that can process the today's network volumes. Using the networking devices found within these data centers, ever larger amounts of network communications can be handled and processed over the internet. For example, banks of servers can handle large volumes of user downloads from a single website.

DESCRIPTION OF FIGURES

Like reference symbols in the various drawings indicate like elements.

DESCRIPTION OF EXAMPLE EMBODIMENTS

Overview

Figure 1:
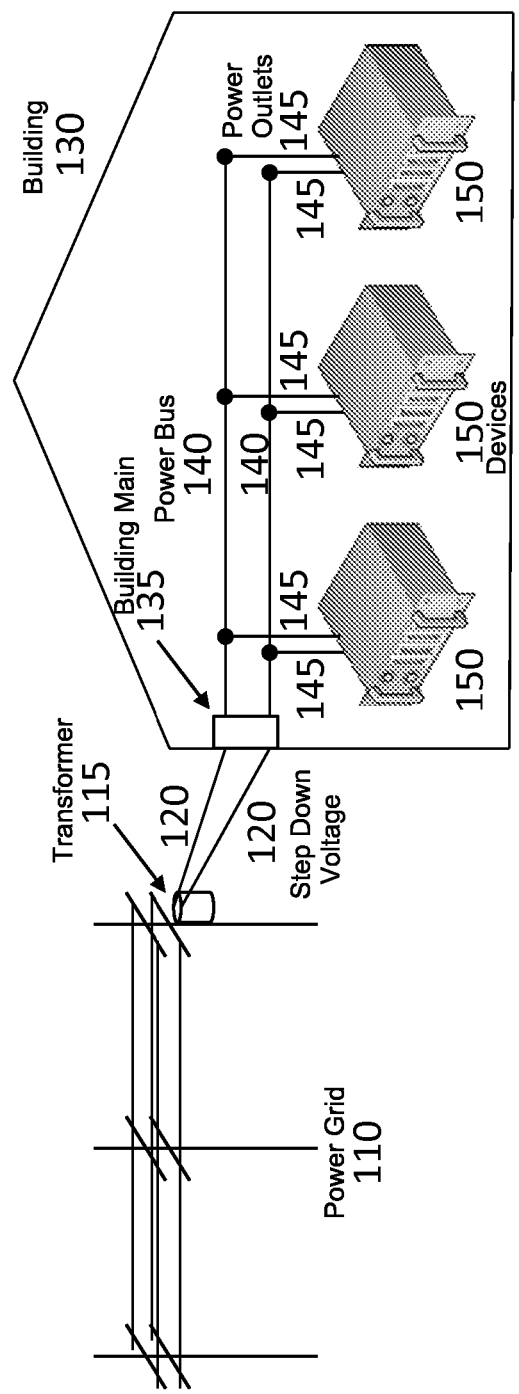
FIG. 1 illustrates an example of network devices receiving power from building mains connected to a power distribution network.

One aspect features a system that has a frame designed to have a form factor that allows it to interface with a power supply receptacle of a networking device. The frame includes an AC input and a DC output. The AC input is configured to receive AC power directly from the power mains of a building and the DC output is configured to deliver DC power to the networking device. The frame also includes a battery, a charging circuit and a voltage regulator. The battery is electrically connected to the charging circuit and the voltage regulator. The charging circuit is electrically connected to the AC input and regulates the recharging of the battery. The voltage regulator is electrically connected to the DC output and regulates the voltage output from the battery.

Another aspect features a frame that includes a battery, a charging circuit, a voltage regulator, an AC input and an AC output. The battery is electrically connected to a charging circuit and a voltage regulator. The charging circuit is electrically connected to the AC input and regulates recharging of the battery. The voltage regulator is electrically connected to the DC output and regulates the voltage output from the battery. The AC input is designed to receive AC power directly from power mains of a building and the DC output is configured to deliver DC power to a networking device.

DETAILED DESCRIPTION

Uninterrupted power supply (UPS) systems are devices that are designed to continue to supply power with a certain voltage and waveform characteristic when there is a loss in power or a voltage dip in the power supplied from an external power grid. The UPS system achieves this by utilizing large banks of batteries and rectifying electronic circuitry. In the context of network data and/or switching centers, UPS systems are used to provide back-up power for the network devices and cooling systems. For such an environment, external power, typically from the local power grid or local cogeneration facility, is provided to the building mains. The UPS system is connected to the building mains and is, in turn, connected electrically to one or more power buses that supply power to the network devices and cooling units.

These UPS systems suffer from a major design problem. Because UPS systems are designed to service power buses that a number of network devices draw power from, UPS systems are typically very large and bulky. As a result, maintenance of such systems is difficult and typically requires specialized technicians that can service and/or replace them. As network data and/or switching centers become more self-reliant, it becomes more important to create power backup systems that are easily serviceable by personnel working in the centers.

One suggested approach to solve the above problem has been to simply integrate a battery into a network device that would power the network device when power from the building main fails. Though this solution solves the need to power the network device during power failures, it creates a major power efficiency problem. Namely, the power supply associated with each network device needs to be designed (rated) to handle a higher power than normal in order to be able to power the network device and recharge the internal battery at the same time. As a result, when the internal battery is recharged, the network device's power supply is operating inefficiently. Multiplied across all the network devices in a network data and/or switching center, this power inefficiency can be very large.

In order to solve the above problems, a networking device is provided with two or more receptacles that are designed such that a power supply unit (PSU) may fit into them and connect with a DC power bus for the networking device. A common slot battery backup unit (CSBBU) is designed such that its physical frame matches the physical frame of the PSU. Thus, the CSBBU may be placed into the second receptacle. In addition, both the PSU and the CSBBU are designed to connect to the mains of the building. Thus, the batteries within the CSBBU are recharged from the building power and not from the PSU. As a result, the PSU does not have to be rated to accommodate a higher power than is necessary to simply power the networking device. Furthermore, the internal logic of the CSBBU is designed such that upon detection of a failure in the AC power from the building mains, the CSBBU activates in order to power the networking device.

FIG. 1 shows a diagram that illustrates a bank of network devices connected to the power mains of a building. Three phase power is distributed across a power distribution network through power grid 110. The power grid 110 includes transformer 115, which steps the voltage of two or more of the phases down to a voltage level useable for the power mains in building 130. The stepped down voltages 120 are distributed to the building mains 135. Network devices 150 are electrically connected to the building mains 135 through power bus 140.

The power grid 110 in power distribution network may be run through a public utility network and/or may be run through a private distribution network supplied by a private cogeneration facility. Stepped down voltages 120 may also be supplied from a source independent from the power grid 110.

For example, stepped down voltages 120 may also be supplied through a private power generator.

The building mains 135 may include a circuit breaker which disconnects stepped down voltages 120 from power bus 140 in the event that current flowing from stepped down voltages 120 becomes larger than a critical threshold value.

Network devices 150 are configured with multiple power outlets 145 to connect to power bus 140. Each power outlet 145 may connect to separate PSUs in the network device with at least one of the power outlets 145 connecting to a CSBBU for the network device.

Figure 2:
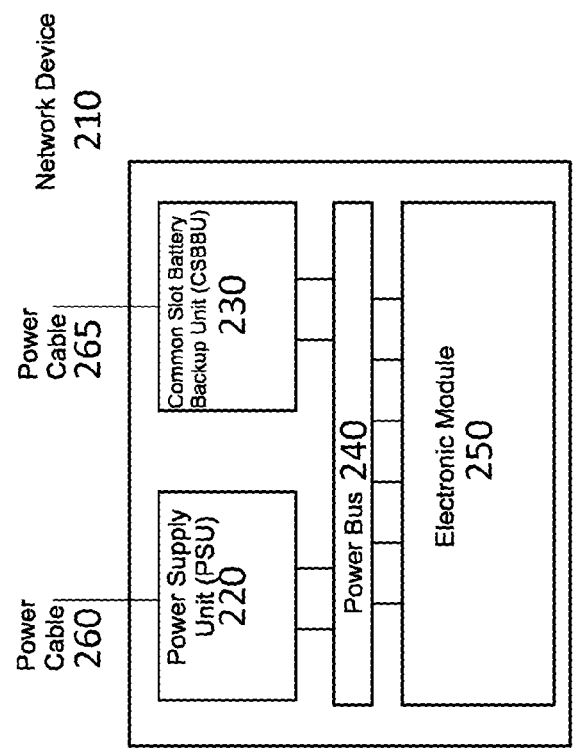
FIG. 2 illustrates an example of a network device that includes a power supply unit (PSU) and a common slot battery backup unit (CSBBU).

FIG. 2 shows a diagram that illustrates the internal modules of a network device 210 that can connect electrically to the power bus 140. The network device 210 includes a PSU 220 and a CSBBU 230 that are electrically connected to an internal power bus 240. The internal power bus 240 is electrically connected to the functional electronic module 250 and provides power for the electronic circuitry found within the functional electronic module 250. The functional electronic module 250 provides for all of the electronic functionality of the network device 210.

The PSU 220 includes electronic circuitry necessary to receive an AC power input from the building mains through power cable 260 and convert the AC power into DC power that can safely power the electronics in the functional electronic module 250. Additionally, the PSU 220 may also include cooling systems to prevent the overheating of the unit. The electronic circuitry and cooling systems of the PSU 220 are housed in a physical case of metal or plastic. The physical case includes electric sockets and/or cables that allow for the PSU to electrically connect to the internal power bus 240 and the power cable 260.

The mechanical structure of network device 210 is designed such that the physical case that houses the electronics of PSU 220 can fit into a cavity/slot within network device 210. The cavity/slot may also be configured with electrical connectors that enable electrical connections to be made between the internal power bus 240 and the PSU 220. These electrical connections can provide both power as well as control information pertaining to the PSU 220. The control information may include, for example, information on the temperature of the PSU 220, information on power loss from the building mains and information on the failure of the PSU 220's electronics.

The CSBBU 230 includes electronic circuitry necessary to provide power to the internal power bus 240 in the event that power fails to be provided through PSU 220. The electronics of the CSBBU 230 may also be configured to provide power to the internal power bus 240 when power fails to be detected from the building mains.

The CSBBU 230 is designed to receive an AC power input from the building mains through power cable 265. This power is used to recharge a battery bank, which in turn provides power to the internal power bus 240 in the event of a power failure. Additionally, the CSBBU 230 may also include cooling systems to prevent the overheating of the unit. The electronic circuitry and cooling systems of the CSBBU 230 are housed in a physical case of metal or plastic. The physical case includes electric sockets and/or cables that allow for the CSBBU to electrically connect to the internal power bus 240 and the power cable 265, thereby having the same form factor as the electrical sockets and/or cables used with the PSU. Additionally, the physical case may have the exact same dimensions as the physical case of PSU 220 so that it may fit in the same cavity/slot that is made for the PSU 220.

The physical case of the CSBBU 230 may also include the same electric sockets and/or cables as those used in the PSU 220, so as to use the same cables to connect to the power mains and the internal power bus 240 as are used by PSU 220. Like the PSU 220, these electrical connections can provide both power as well as control information pertaining to the CSBBU 230. The control information may include, for example, information on the temperature of the CSBBU 230, information on power loss from the building mains, information on the failure of the CSBBU 230's electronics and information related to switching the battery power on and off.

Figure 3:
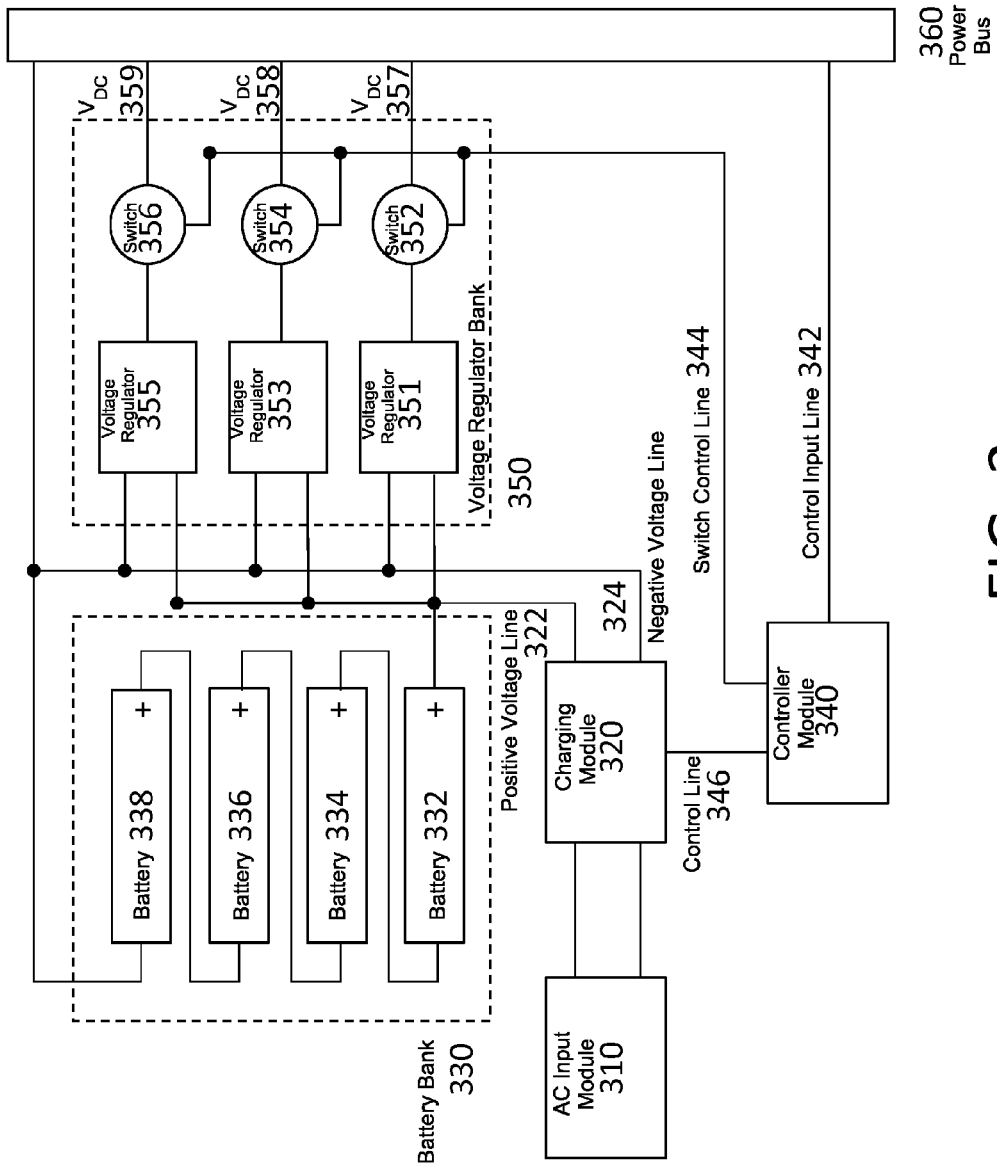
FIG. 3 illustrates an example of circuit modules that form a CSBBU.

FIG. 3 shows a diagram that illustrates the circuitry of the CSBBU. An AC input module 310 is electrically connected to a charging module 320. A positive voltage line 322 and a negative voltage line 324 electrically connects the charging module 320 with the battery bank 330, the voltage regulators 351, 353 and 355 and the internal power bus 360. In addition, a control line 346 electrically connects the charging module 320 to a controller module 340. The controller module 340 is electrically connected to the internal power bus 360 through control input line 342 and is electrically connected to a bank of electronic switches 352, 354 and 356 by switch control line 344. The bank of electronic switches 352, 354 and 356 are in turn electrically connected respectively to the voltage regulators 351, 353 and 355 to form voltage regulator bank 350.

The AC input module 310 includes electronic circuitry that is designed to accept and regulate AC voltage inputted from the building mains. The AC input module 310 may also include appropriate sockets and/or connectors necessary to make an electrical connection to the building mains.

The charging module 320 includes electronic circuitry that converts the AC input from the AC input module 310 into a DC output that is suitable to safely charge the batteries 332, 334, 336 and 338 in battery bank 330. The charging is regulated from electrical control data sent through control line 346, supplied by controller module 340. For example, if controller module 340 sends a transmission to charging circuitry 320 that the batteries will provide power to the internal power bus 360, the charging circuitry 320 will stop attempting to charge the battery bank 330.

The controller module 340 includes electronic circuitry that receives control inputs from control input line 342 that provide information on whether the battery should power the internal power bus 360. For example, the information may indicate whether the AC input from the other PSUs in the network device are ok and/or whether the power output from the PSUs in the network device are ok. Based on the received information, the controller module can determine that the internal power bus 360 requires power to be provided by the battery bank 330. Once determined, the controller module 340 communicates with the charging module 320 to shut off recharging of the battery bank 330, and communicates with switches 352, 354 and 356 in voltage regulator bank 350 to switch on in order to provide DC voltages 357, 358 and 359 to the internal power bus 360.

Voltage regulator bank 350 includes voltage regulator modules 351, 353 and 355 that are designed with electronic circuitry to produce DC voltages 357, 358 and 359 which are different from each other and from the voltage on line 324. The control data supplied by control line 344 from controller module 340 can switch one or more of electronic switches 352, 354 and 356 on in order to supply voltages 357, 358 and 359 to the internal power bus 360.

Figure 4:
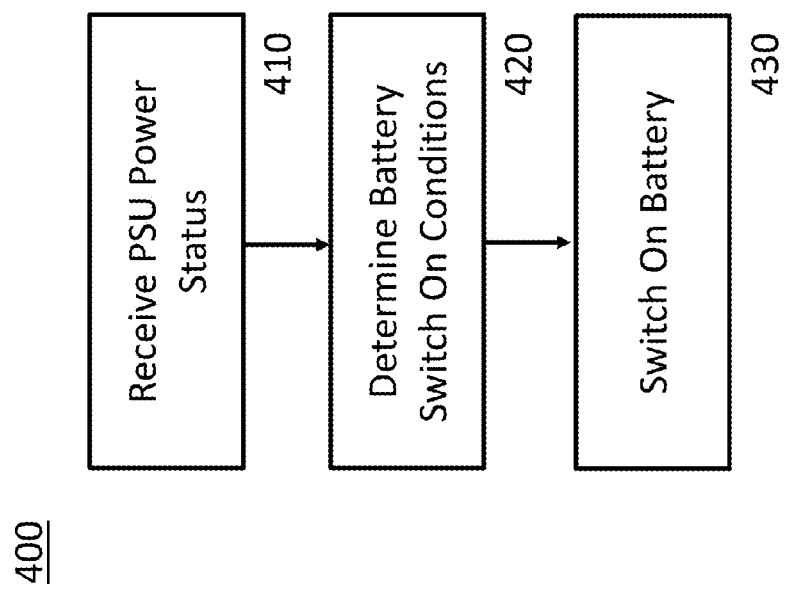
FIG. 4 illustrates a method for providing power to a network device through a CSBBU.

FIG. 4 shows a flow chart 400 illustrating a process by which power is supplied by CSBBU to the internal power bus of the network device. A PSU power status is received at 410. Based on the received PSU power status, a determination is made at 420 as to whether battery power should be switched on in order to supply power to the internal power bus of the networking device. If a determination is made that battery power is needed, battery power is switched on at 430.

The received PSU power status can either indicate that the AC input from the PSUs in the network device are functioning within a normal range of operation and/or whether the DC power output from the other PSUs is functioning within a normal range of operation. A determination is made at 420 if the received PSU power status indicates that the PSU is not functioning within a normal range of operation sufficient to power the network device. This determination may be made through a look up data table or through an algorithmic process.

Alternatively, the received PSU power status may comprise raw AC and DC power transmissions from the PSUs. In this case, the determination at 420 may comprise using a data table and/or algorithm to determine if the received PSU power status is operating below necessary powering conditions for the network device to function.

Generally, the operations are performed on the CSBBU described in FIG. 2 and FIG. 3. However, the operations may be implemented and performed on other devices in other configurations.

Figure 5:
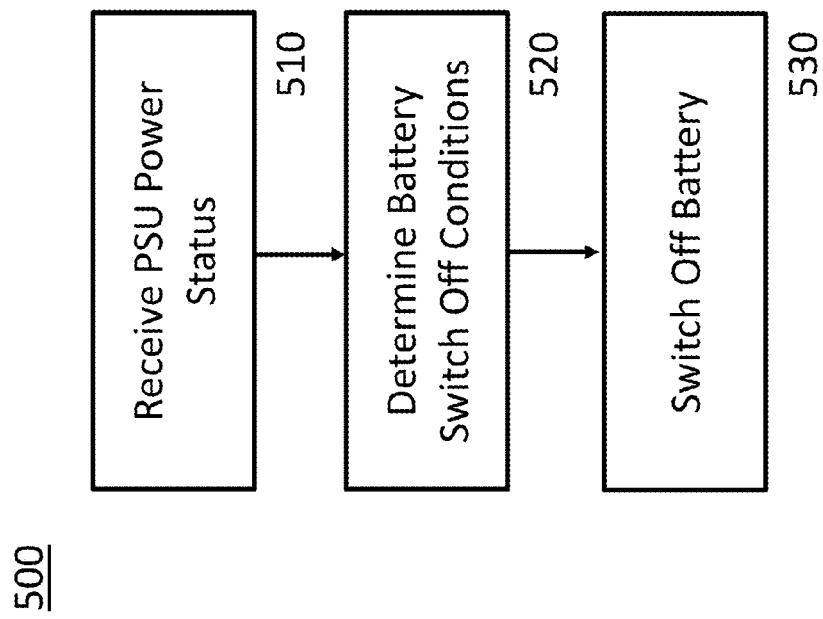
FIG. 5 illustrates a method for shutting off power to a network device from a CSBBU.

FIG. 5 shows a flow chart 500 illustrating a process by which the supplied from the CSBBU to the internal power bus of the network device is stopped. A PSU power status is received at 510. Based on the received PSU power status, a determination is made at 520 as to whether battery power should be switched off in order to stop supplying power to the internal power bus of the networking device. If a determination is made that battery power is no longer needed, battery power is switched off at 530.

Similar to 420 in FIG. 4, the received PSU power status can either indicate that the AC input from the PSUs in the network device are functioning within a normal range of operation and/or whether the DC power output from the other PSUs is functioning within a normal range of operation. A determination is made at 520 if the received PSU power status indicates that the PSU is functioning within a normal range of operation sufficient to power the network device. This determination may be made through a look up data table or through an algorithmic process.

Alternatively, the received PSU power status may comprise raw AC and DC power transmissions from the PSUs. In this case, the determination at 520 may comprise using a data table and/or algorithm to determine if the received PSU power status is operating at sufficient levels to power the network device.

Generally, the operations are performed on the CSBBU described in FIG. 2 and FIG. 3. However, the operations may be implemented and performed on other devices in other configurations.

Although an CSBBU that can fit into a PSU slot in a network device is described, such an CSBBU may be also be placed in any number of other electronic devices that include more than one power supply slot.

Additionally, this CSBBU can be designed to be hot swappable so that it may be placed in and out of network device while the network device is still powered by at least one of its PSUs The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A network device comprising:
   a housing including at least two slots formed internally to the housing;
   a first frame including a power supply unit that is disposed in a first slot of the at least two slots and configured to receive AC power directly from power mains of a building and provide power to the network device;
   a second frame including a battery backup unit disposed in a second slot of the at least two slots, the battery backup unit including an AC electrical socket and a DC output, the AC electrical socket configured to receive AC power directly from power mains of a building, the DC output configured to deliver DC power to the networking device; and
   an electronic module within the housing connected via a bus to both the power supply unit in the first frame and the battery backup unit in the second frame, wherein
   the battery is electrically connected to a charging circuit and a voltage regulator;
   the charging circuit configured to be electrically connected to the AC input, the charging circuit configured to be within the second frame, the charging circuit configured to regulate recharging of the battery,
   the voltage regulator electrically connected to the DC output, the voltage regulator configured to be with the second frame, the voltage regulator configured to regulate the voltage output from the battery, and
   wherein at least the second frame is configured to be removable from the networking device while the networking device is powered by the power supply.

2. The system of claim 1 further comprising a controller configured to be electrically connected to the voltage regulator, the controller configured to monitor power failure.

3. The system of claim 2, wherein the voltage regulator monitors power failure by monitoring power in the network device.

4. The system of claim 3, wherein upon detecting a power failure, the controller is further configured to communicate with a switch to supply power to the DC output, the switch electrically connected to the DC output and the voltage regulator.

5. The system of claim 1, wherein the AC electrical socket is enabled by a first electrical connector having a form factor.

6. The system of claim 1, wherein regulating the recharging of the battery through the charging circuit comprises converting the AC power to a recharging DC power, the recharging DC power associated with the power range necessary to recharge the battery.

7. The system of claim 1, wherein regulating the DC output through the voltage regulator comprises converting a DC battery power output supplied by the battery to a system DC power, the system DC power associated with the power range necessary to power the network device.

* * * * *